3,806,563
METHOD OF FORMULATING AND MOLDING RAPIDLY DEHYDRATABLE WATER EXTENDED POLYESTER ARTICLE
Sidney G. Lammers, Liverpool, N.Y., assignor to Dart Industries Inc., Los Angeles, Calif.
No Drawing. Continuation-in-part of applications Ser. No. 876,560, Nov. 13, 1969, and Ser. No. 60,704, Aug. 3, 1970. This application Jan. 24, 1972, Ser. No. 220,435
Int. Cl. B29d 27/04; C08f 47/08
U.S. Cl. 264—41          3 Claims

ABSTRACT OF THE DISCLOSURE

A method of easily reducing the water content of cast or molded water extended polyester articles relies principally upon controlling the particle size in the resin/water emulsion from which the article is molded. Such control may be implemented through the employment of surface active agents and aggregates in the molding composition and the careful controlled mixing of the composition. Regardless of the technique employed, this invention conceptually includes the production of a water extended polyester three-dimensional open molded network whose particle size may be discreetly varied enabling the water in a finally molded product to be quickly and readily released with or without the application of heat thereto. In one embodiment, controlled amounts of selected surfactants, whether they are considered to be emulsifiers, solubilizers, dispersing agents, wetting agents or detergents, are added to the resin/water molding compound emulsion and under controlled mixing conditions there is a regulated release of water from the water/polyester molding composition and emulsion.

CROSS-REFERENCES TO RELATED APPLICATIONS

This application is a continuation-in-part of copending applications Ser. No. 876,560 filed Nov. 13, 1969, and Ser. No. 60,704 filed Aug. 3, 1970 both now abandoned.

SPECIFICATION

This invention relates to casting or molding compositions and to a casting or molding method. More particularly, the invention concerns a molding composition of water-extendible polyester resin as is more fully described hereinafter and that is adapted to accommodate the release of water therefrom subsequent to the molding or casting of an article. Further, the invention contemplates a method of casting or molding which enables a subsequent reduction in the water content of a molded article.

A recent innovation in the synthetic molded plastics field has been the introduction of water-extendible polyester resins such as are disclosed in U.S. Pat. No. 3,256,-219 and which is incorporated herein by reference. This material quite obviously offers attractive economic advantages for a user since water is as inexpensive a resin extender as there is presently available. Such advantages are further enhanced because it is possible to extend these resins with as much as 90% water and to incorporate pigments, oil or water soluble dyes as colorants in the molding composition. Additional features which further enhance the fields of use for such resins relate to the several characteristics that the molded products exhibit and which include their ability to be nailed, sawed, sanded, machined, adhesively bonded and reinforced with a variety of fibrous and/or granular fillers. Thus, it should be apparent that these resins are adaptable for use in a variety of consumer products to supplant wood, plaster, ceramics, other plastics, etc.

These water-extendible polyester resins further enable the user to produce castings that are either resilient or rigid. Similarly, for any given resin, it is possible to vary the physical properties by variance of water loading (i.e., ratio of water to resin content). A typical characteristic is the 0.5 to 1.4% shrinkage that may be expected when using water-extendible resins. This approximates the shrinkages that are experienced with other unsaturated polyesters, however, when using the water-extendible material, the shrinkage is proportional to the percentage of water employed and the higher the water content, the lower the shrinkage value that may be expected. In this respect, a further advantage has been discovered in conjunction with the removal of water from the molded product. Typical shrinkage values for a water laden polyester (50% resin and 50% water) are on the order of 1.0%; whereas in a similarly composed product from which the water has been eliminated using this process, one may expect about a 0.5% shrinkage, a 50% improvement. It is expected that this improvement would be reflected regardless of the amount of water contained in the molding emulsion.

Other similar resins that have been touted to the trade as being suitable for rapid and easy dehydration do not possess nearly the dimensional stability of the formulation here disclosed. In fact, these resins are reported to shrink in amounts of between about 3 and 5% during cure and dehydration. Although such excessive shrinkage may be tolerable, it can affect reproducibility to exact dimensions and requires mold scale-up that is unnecessary with the instant resin system.

It should be noted that articles incorporating the water-extendible polyester resins as are described in U.S. Pat. 3,256,219 and including those that are commercially available, subsequent to casting or molding, tend to experience a rapid loss of water from all exposed surfaces. However, the overall effect of this has been found to be minor. Diffusion of water from below a $3/16$ inch depth is extremely slow and even after extended heating at 160° F. water is not driven off rapidly from these cellular composites and is especially well confined in those products which incorporate between 40 and 70% resin. Although the water extender may be driven off by extended heating at temperatures approaching 212° F., this is unsatisfactory from a commercial point of view.

Further, it should be obvious that because of this water retention cured castings having a water content of between 50–65% will have a density of between 60–65 pounds per cubic foot, approximately that of water. This, although lighter than many typical casting materials, represents a serious disadvantage for the product manufacturer. Therefore, even though the water-extendible resins are very satisfactory in many respects, an inability to control or restrict the final cast product weight is of major concern.

The primary objective of this invention, therefore, is to provide a modified water-extendible polyester resin composition process of molding and article molded therefrom in which the water content of a cured casting of this material may be effectively and economically controlled and reduced, thus reducing the weight of such castings. Effectuation of such an objective quite obviously will not only further enhance the economics of water-extendible polyesters through a reduction in shipping costs, etc., but will also afford the molder with a product and technique that will produce better shrinkage characteristics within the molded product.

In summary, this invention, among other things, encompasses a technique in which the particle size of a polyester resin and water composition is carefully controlled during the emulsion forming stage of mixing. As indicated above, such control may be effected by the introduction of certain surface active agents into the emulsion of these water-extendible unsaturated polyester resins, thus raising the emulsifier level thereof above that considered to be the optimum. Use of these certain surfactants in quantities of between 3% and 7% (based upon resin weight and above that normally existent in the resins) are believed to reduce the stability or break the emulsion during and subsequent to gelling of the material, thus releasing the water extender. It is further contemplated that those surfactants which are lipophilic in nature are especially suitable for carrying the invention into effect, and that by manipulation of the Hydrophile-Lipophil Balance rating, more fully described below, one may to some degree control the amount of water that will be initially given up by a cast or molded article.

Likewise, it has been found to be beneficial to include aggregate materials in conjunction with surface active agents or alone to assist in breaking the emulsion to release the water extender. Such release of course occurs during and subsequent to the gelling of the emulsion.

Regardless of the technique employed in obtaining the reduction in water content of the final casting, the surfactant should be added to the polyester resin or the water/polyester resin emulsion prior to the catalization thereof. The particular time of addition would not appear significant, however, thorough controlled mixing is desirable to form a uniform dispersion of the surfactant, etc., throughout the emulsion.

Also, as indicated above, other methods and additives may be employed to assist in the control of particle size. For example, mixing speeds, agitator configuration and mixer dimensions may all be varied to accomplish the end result sought. Similarly, through-put rates may be varied on commercially available equipment such as is available from the Gray Company, Inc., of Minneapolis, Minnesota, under the trade designation Hydra-Cat. Thus, it has been found that by carefully controlled mixing a predominance of the water and resin particle sizes within the emulsion may be maintained above a minimum level where virtually no water will release. In most instances, as is discussed in more detail hereinafter, these commercially available machines must be adjusted significantly to retard the degree of mixing of the emulsion.

As is mentioned above, the invention relates to the use of water-extendible unsaturated polyester resins as casting or molding compositions. These resins when used as intended are mixed with water and various other additives to form a thermosetting emulsion. As would be expected, the properties of any final cast article incorporating such resins may be determined by the resin selection, the amount of water included, the catalyst system employed, and the filler, if any, that is used therein.

These water-extendible polyester resins are readily available in the trade from sources such as Ashland Chemical Company, Reichhold Chemicals, Inc., and American Cyanamid, as well as others. Some of these may be obtained from the manufacturers in a pre-promoted condition while other producers supply only the resin, leaving the formulating to the user. For example, Reichhold Chemicals, Inc., markets several promoted polyester resins under the trademark Polylite, and the Ashland Chemical Company and American Cyanamid offer several unpromoted resins under the designation Aropol WEP and Laminac® EPX 295-1, respectively. Characteristically similar materials are disclosed in U.S. Pats. 3,437,615, 3,437,618, and 3,442,835.

A water-extendible polyester resin is typically a dispersion of an aqueous phase in a continuous phase containing monomeric material. It is possible to form stable emulsions of these materials having a continuous phase containing monomeric material and a dispersed aqueous phase, in which the aqueous phase remains dispersed even during and after the monomer is polymerized. One preferred method of forming such stab emulsions utilizes microgels as emulsifiers. Microgels contain polymer, solvent and non-solvent, appear to be gelatinous and are generally formed by introducing a nonsolvent for a polymer into a solution containing the polymer. An emulsion having a dispersed aqueous phase and a continuous phase will be stabilized by a microgel which will form at the phase boundary of the continuous phase and the aqueous phase. The continuous phase must contain a constituent which will be at least partly separated and precipitated from the continuous phase at the phase boundary. These unsaturated water extendible resins therefore provide a thermosetting water-in-oil emulsion in which the oil phase is capable of being copolymerized and the water phase is retained as discrete droplets dispersed throughout the continuous polymerizable oil phase comprising:

(1) an unsaturated polyester of an $\alpha,\beta$-ethylenically unsaturated carboxylic acid, and
(2) a copolymerizable solvent, and
(3) an emulsifier having an HLB number (as herein defined) of from 2 to 8 which is a glycerolysis product of vegetable oils, a saturated mono- and di-glyceride ester of stearic acid, a saturated mono-glyceride of stearic acid, or mixtures thereof.

Accordingly, the emulsion, in a preferred form of the invention, will include between about 45% and 55% of an ethylenically unsaturated polyester resin, 35% and 45% of a copolymerizable ethylenically unsaturated monomer, and 13% and 17% of an emulsifier having an HLB rating of between about 1 and 9 each percentage being based upon total weight of resin, monomer and emulsifier.

The unsaturated polyesters are unsaturated linear polyester resins based preferably on dibasic acids, i.e., ethylenically unsaturated dicarboxylic acids, and polyhydric alcohols (usualy dihydric alcohols) capable of being cross-linked with vinyl monomers to form thermostat copolymers. Preferred polyesters are unsaturated linear polyesters of the type described above which cure by free radical-induced copolymerization of a maleic fumaric double bond with a vinyl monomer, e.g., styrene. The term "polyester" is not intended to include oil-modified polyesters which cure by oxidation nor is it intended to include the high molecular weight polyesters, such as those used to make fibres and films. Preferably, the unsaturated polyesters utilized will have at least two ethylene bonds per molecule.

Unsaturated polyester resins, cross-linked with vinyl monomers, have long been used in the manufacture of glass-reinforced plastics. However, the use of a polyester resin and a vinyl monomer which cross-link the polyester to form an intractible resin in water-in-oil emulsions to produce thermoset emulsions is novel. A typical unsaturated polyester can be readily prepared by fusing a mixture of phthalic anhydride, maleic anhydride and propylene glycol at about 200° C. under an inert gas blanket. A polyester such as is prepared above has a low molecular weight and will melt and flow on heating and readily dissolve in many solvents. The polyester resin may be cross-linked to form an intractible resin by the addition of a vinyl monomer, such as styrene, and a free radical forming catalyst, such as benzoyl peroxide. The free radical precursor decomposes, upon heating or promotion, to form free radicals. These free radicals add to the polymerizable double bond in the polyester generating a new free radical which in turn adds to a vinyl monomer molecule generating a new free radical which in turn adds to a polyester double bond, etc., until the entire mass has cured to a thermoset solid. To prevent premature gelation during production, storage and shipment, an inhibitor, such as hydroquinone, can be added to the resin at time of manufacture. The inhibitor acts as a free-radical trap, preventing premature gelation by free-radical forming compounds which might accidentally be formed by excess heat or air oxidation during processing and storage. Further, curing may be conducted at about room temperature by incorporation of a compound which promotes the decomposition of the free-radical forming compound. Selection of the promoter is determined by the particular free-radical forming compound which is used.

The water-extendible resin mixture as is commercially available therefore will generally include the vinyl monomer in amounts of between about 38 and 40% by weight; the emulsifier will be present in quantities of about 10 to 12% by weight; and the balance will be the basic polyester resin, about 50%.

Typical water-extendible polyester resin properties are as follows:

|  | Aropol[1] WEP 22 | Aropol WEP 23 | Aropol WEP 26 | Aropol WEP 27 | Aropol WEP 41 | Aropol WEP 42 |
|---|---|---|---|---|---|---|
| Brookfield viscosity (cps.) | +250 | +400 | 145±5 | 50±5 | 60±5 | 30±5 |
| Specific gravity |  |  | 1.075 | 1.039 | 1.060 | 1.025 |
| Weight, lbs./gal | 8.40 | 8.40 | 8.94 | 8.63 | 8.81 | 8.52 |
| Gardner color | (2) | (2) | <3 | <3 | <2 | <2 |
| Gel time (min.) | +3 | +3 | +11 | +15 | +13 | +17 |
| Time peak exotherm (min.) | +8 | +6 | +11 | 31 | 20 | +28 |
| Peak exotherm (° F.) | 216 | 213 | 164 | 168 | 168 | 167 |

[1] Aropol 21 is similar to Aropol 22.
[2] Light amber.

|  | Polylite 32-176 | Polylite 32-177 | Polylite 32-178 | Polylite 32-179 |
|---|---|---|---|---|
| Brookfield viscosity (cps.) | 400-800 | 50-100 | 190-250 | 100-200. |
| Color | Light amber | Light amber | Light amber | Pink amber. |
| Gel time (min.) | 5-7 | 5-10 | 2½-5 | 7-13. |

|  | Laminac® EPX 289-4 | Laminac® EPX 295-1 |
|---|---|---|
| Brookfield viscosity (poises) | 1.0-1.5 | 0.4-1.0. |
| Weight, lbs./gal | 8.50 | 8.50-8.60. |
| Color | Purple | Dark red. |
| Gel time (min.) | +2 | 1-3. |
| Time peak exotherm (min.) | +8 | 7-12. |
| Peak exotherm (° F.) | 170-180 | 160-180. |

Although molded articles made of these resins may be extended with as much as 90% water, it is expected that the broadest continuing range of application will be on the order of 40 to 70% water (of total emulsion weight).

The viscosity of the emulsion begins to increase rapidly when the water level reaches about the 55% mark (of total emulsion weight). This, however, may be reduced and controlled with the addition of small amounts of styrene monomer or the addition of mineral aggregate fillers or the like to the emulsion.

Formation of this new molding emulsion (water in oil) encompasses the addition to the resin of water, promoters (where not incorporated by the resin manufacturer), surfactants, sometimes fillers and catalysts. Such includes the water globules as a uniform dispersion of fine droplets in the resin, which droplets unless particle size is carefully controlled will be retained within a matrix of the cured resin. In particular, it has been found to be helpful to include additional surfactant as noted above and/or mineral aggregate filler to the emulsion to readily effect the water release that forms a part of this invention. The major variables therefore which affect the molding composition and relate to the invention are (1) the resin, (2) the water level, (3) the surfactant and/or fillers, (4) the catalyst system, and (5) the degree of mixing as a control of the emulsion particle size. Each of the latter four will be dealt with in further detail below.

The catalyst system encompasses the promoter employed by the user and in the preferred embodiment the overall curing system employs cobalt-octoate, dimethylaniline (DMA) and methyl ethyl ketone peroxide (MEKP). These particular constituents are preferred because of lower cost, higher strengths, greater safety and ease of metering and mixing. Other commercially available promotion ssytems as set forth below are equally effective however.

The cobalt-octoate and DMA are dissolved in the resin and the promoted resin is then emulsified and catalyzed. Cobalt-octoate initiates the breakdown of the peroxide to cure the resin and the dimethylaniline acts synergistically therewith to produce a rapid gel. Although about a 0.5% quantity of DMA based upon resin weight is suggested, longer gel times may be obtained by reducing the dimethylaniline levels to as low as 0.1%.

Blended hydrogen peroxide and water soluble methyl ethyl ketone peroxide are recommended for use in this system, however, hydrogen peroxide used along may also be effective. The catalyst blend should be agitated prior to use and it may be added to the resinous composition either by stirring into the preformed emulsion, injection into the water stream during continuous mixing or by predissolving in the water extender.

Another curing system that can be used employs benzoyl peroxide (BPO) and dimethyltoluidine. This system has been found to produce the most flexible composites but poses a considerable hazard due to its flammability. In use it is suggested that the benzoyl peroxide be dissolved in a small amount of warm styrene prior to addition to an unpromoted resin. Finally, to complete catalysis the dimethyltoluidine (DMT) is added, generally in an amount approximating 0.5% based on resin weight. 0.3% of BPO based upon resin weight, however, has been found to be quite effective.

Subsequent to the addition of the catalyst, curing begins. It is not uncommon to have these water extended resins develop between 75 and 90% of their strength within the first 60 minutes of cure. Exotherm temperatures (peak) generally fall within the 140°-200° F. range and depend upon the water content and its temperature and the type of resin. Should it be desired to accelerate curing, warm water may be used or amine promoters may be included in the emulsion.

Curing rates, water temperatures, etc., must be carefully controlled, however, in order to prevent an excessive exotherm which, it should be obvious, might produce cracked castings.

Prior to or during final catalyzation, the emulsion is thoroughly mixed at conditions of moderate to high shear. This tends to emulsify the water in the very fine droplets described in such manner that the water, surfactant and promoter are essentially uniformly dispersed with the resin coated thereon. A stable and uniform emulsion is desirable for good performance, however, in one very important aspect of the invention the degree of mixing should be carefully controlled. Typically, commercial polyester molding equipment, for example, employs mixers which operate at between 3600 and 10,000 r.p.m. At these speeds for the typical mix time minimum water release it obtained. If, however, the mix speeds are reduced to the range between 1000 r.p.m. and 3500 r.p.m., varying percentages of water will be emitted. It should, of course, be recognized that the configuration of the mixture chamber, the shape of blades and the through-put rate all affect final particle size and therefore will be determinative of the mixing speed employed. Similarly, if other mixing techniques are used, particle size should be appropriately controlled to obtain the best overall effects.

Emulsion particle size, in theory, therefore affects the water release sought and this aspect is particularly important to the invention. Typical emulsions which will produce this effect include a maporitv of particles having diameters greater than 1.6μ (about 0.0016 mm.). Similarly, such emulsion will also exhibit numerous particles which are over 2.6μ (about 0.0026 mm.) in diameter. Minimal water loss will be attained when a higher percentage of particles are of a smaller diameter. For example, such minimal loss may occur where the majority of particles are less than 1.6μ (about 0.0016 mm.) in diameter, and very few exceed a diameter of 2.3μ (about 0.0023 mm.).

Also as indicated, addition of certain surface active agents, emulsifiers, wetting agents or surfactants more fully discussed below is one of several ways of carrying out the invention. Further, it should be pointed out that the water, promoters and surfactants are added to the resin and not the reverse. Of course, if the resin is pre-promoted and or the surfactant or other additives have been added thereto during some earlier production stage, this becomes unnecessary. In this regard, however, note that care must be exercised when making additions to the resins and when mixing to avoid creation of an inverted emulsion (oil in water).

These surfactants, when used either alone or when used in conjunction with expanded mineral aggregates or similar substances, tend to effect and control the release of water from the molding or casting as it cures.

As indicated, the preferred system for creating the easily dehydratable water-extendible polyester resin and product incorporates additional surfactant into the commercially available resin in amounts of between about 3 and 7%. The total emulsifier loading of the water-extendible resin is therefore maintained at between about 13 and 17% as opposed to the 10–12% in the prior art resins.

Similarly, inert expanded mineral aggregates, such as that marketed under the tradename Perlite may be used to assist in the water release making up this invention. It is theorized that such aggregate tends to promote or assist in the formation of large particles in the emulsion and thereby creates a structural network through which the water may escape during and subsequent to curing. The mentioned aggregate is an inert vitreous substance made up of a volcanic aluminum, magnesium silicate. Although this material will break the emulsion as discussed, it should be noted that control of the emulsion particle size must be carefully maintained for such to be effective. Here, it also appears pertinent to note that the smaller the size of the aggregate, the more effective it apparently is in affecting emulsion particle size.

The typical thoroughly mixed water-extendible polyester composite without the added surfactant, aggregate or other similar additive retains the large majority of its emulsified water. In effect, the web-like inner structure of the composite tends to physically trap and entrain the water globules. The additional surfactant, aggregate or other emulsion treating material causes the emulsion to break during cure or that the surface tension is so reduced as to enable the water to escape through the net-like structure of the composite.

Added quantities of between about 3% and 7% based on resin weight of these surfactants will release virtually all of the water that has been originally used to extend the resin if the emulsion particle size is properly maintained. Thus, it can be seen that if the original emulsion contains 50% water, its removal from the finished cast article will represent about a 50% reduction in the weight thereof. To further assist that water release, it may be advantageous to oven treat the water extended polyester molded articles subsequent to demolding. This hot cycle, when maintained at approximately 125° F. to 200° F., will after about a 12 hour period have given up their maximum of water. In addition, such treatment apparently relieves internal stresss within the molded article and substantially elimi-nates warpage. It is further theorized that modification of the hydrophilic-lipophilic balance of the surfactant employed may also have an effect on the amount of water released.

Most suitable among the many surface active agents that are commercially available are those which are lipophilic in nature. This, of course, means that these surfactants are more oil loving than they are water loving. In order to better identify those which may be so employed reference is made to a published Atlas Chemical Company surfactant identification system which rates these various agents based upon their Hydrophilic-Lipophile Balance (HLB).

Briefly, the HLB rating enables assignment of a number of the ingredients or combination of ingredients that are to be emulsified, and then to choose an emulsifier or blend of emulsifiers having this same number. The HLB of an emulsifier or surfactant is an expression of its Hydrophile-Lipophile Balance, i.e., the balance of the size and strength of the hydrophilic (water-loving or polar) and the lipophilic (oil-loving or nonpolar) groups of the emulsifier. All emulsifiers consist of a molecule that combines both hydrophilic and lipophilic groups.

An emulsifier that is lipophilic is assigned a low HLB number (below 9.0) and the one that is hydrophilic is given a high HLB number (about 11.0). Those in the 9–11 bracket are considered intermediate. The HLB of an emulsifier is related to its solubility, thus, an emulsifier having a low HLB will tend to be oil-soluble and one having a high HLB wil tend to be water-soluble.

The number itself in this system, is merely an indication of the percentage weight of the hydrophilic portion of the nonionic emulsifier molecule. Thus, if a nonionic emulsifier were 100% hydrophilic, it would be expected to have an HLB of 100, however, in this system, such an emulsifier (which does not exist) would be assigned an HLB value of 20, the factor ⅕ having been adopted for convenience. HLB values for most non-ionic emulsifiers can be calculated from either theoretical composition or analytical data. For example, HLB values of most polyol fatty acid esters may be calculated with the formula:

$$HLB = 20\left(1 - \frac{S}{A}\right)$$

where
S=sap. number of the ester
A=acid number of the recovered acid

In cases where the hydrophilic portion consists of ethylene oxide only (polyoxyethylene stearates) the formula is:

$HLB = E/5$ where E=weight percent oxyethylene content.

The experimental method of HLB determination, while not precise, briefly consists of blending an unkonwn emulsifier in varying ratios with an emulsifier of known HLB and using the blend to emulsify an oil of known required HLB. The blend which performs best is assumed to have an HLB value approximately equal to the required HLB of the oil, so that the HLB of the unknown can be calculated.

Of those surfactants which are deemed suitable for use in this invention are the sorbitan fatty acid esters commercially available under the trademark Arlacel from Atlas Chemical Ind., Inc. These, as well as other nonionic emulsifiers, are chemically suitable and exhibit HLB values between about 1 and 9. One such surfactant, sorbitan sesquioleate, is particularly well suited for use in the invention as is more fully set forth below.

Thus, it may be seen from the foregoing that by using the invention as described not only are the prior advantages of exter-extendible polyesters retained but by controlled elimination of the water extender weight may now also be varied as the user desires.

A further understanding of the invention will be had from a consideration of the following examples which are set forth to illustrate the preferred embodiments of the invention.

EXAMPLE I

As a control, water-extended polyester (Aropol WEP) for casting and molding that is obtainable from Ashland Chemical Company, is mixed in the quantities specified to produce a water in oil emulsion:

50% Water extendible polyester resin (AROPOL WEP 21)
1.25% (based on weight of resin) cobalt-octoate (12%)
0.50% (based on weight of resin) dimethylaniline (D.M.A.)
50% (approximate) water
0.50% (based on weight of resin) methyl ethyl ketone peroxide/hydrogen peroxide blend This emulsified water extended and catalyzed resin is then poured into an approximate 1⅜ inch cubic mold. After gelling, the water-extended polyester resin cube is removed from the mold and its weight is found to be approximately 46 grams. The molded cube is thereafter placed in an oven for a 24-hour period at an approximate temperature of 140° F. Upon removal from the oven, the cube is again weighed and is found to weigh approximately 44 grams, thus, indicating a 2 gram water loss. The same cube will weigh approximately 42 grams after about 3 months' exposure to inside atmospheric conditions and about 35 grams after about 2½ years' similar exposure.

Similarly, another water in oil emulsion is prepared in which the same constituents are again added to the emulsion in the quantities used for the control sample. In this instance, however, 5% (based on the weight of Resin) of Arlacel® C. (Sorbitan sesquioleate—HLB #3.7) obtainable from Atlas Chemical Industries, Inc., is added to the emulsion. Addition of this surface active agent may be found to increase the total emulsion level to about 15% and likewise raises the viscosity. The emulsified, water-extended, and catalyzed resin is then poured into several approximate 1⅜ inch cubic molds and is left until it has gelled. The weight of this cube upon removal is approximately 41 grams and after being oven exposed for about 24 hours at 140° F., its weight may be found to be approximately 23 grams. This cube after exposure to normal inside atmospheric conditions for a period of about 3 months and 2½ years is found to weigh approximately 23 grams. Thus, virtually no water loss is evident after extended periods of time. After a second molded cube having the increased emulsifier level is demolded and is exposed to typical inside atmospheric conditions for a period of 24 hours, it is found to weigh approximately 25 grams. This indicates a 20 gram water loss from the cube as originally withdrawn from the mold. Each cube that is molded from the emulsion including the added surface active agent may be seen to possess good physical properties and surface characteristics while that cube having the usual emulsifier level tends to have surface distortion and significant shrinkage patterns. Furthermore, each cube from which the water is removed is receptive to both water and solvent based paints.

EXAMPLE II

A water-extended polyester emulsion of the following constituents is prepared:

2000 grams water-extendible polyester resin (Aropol WEP 21) (consisting of about 50% polyester; 40% styrene monomer; and 10% emulsifier)
25 grams cobalt-octoate (12%)
4 grams dimethylaniline (D.M.A.)
2000 grams water a 400 gram sample of this emulsion is further modified to include 6 grams of the surfactant, Arlacel® C (less than 3% based upon resin weight), and 1 gram of the catalyst, methyl ethyl ketone peroxide/hydrogen peroxide blend. Two castings of about 150 grams and 189 grams, respectively, are poured from the modified emulsion. After demolding and about two days of exposure to inside atmospheric conditions, the 150 gram casting will weigh approximately 148 grams, indicating a 2 gram or 3% water loss. The 189 gram casting after demolding and exposure in a 150° F. oven for about 2 days will weigh about 181 grams indicating an 8% water loss.

EXAMPLE III

Another 400 gram sample of the emulsion described in Example II is modified with 8 grams of the surfactant Arlacel® C (about 3.7% based upon resin weight) and two castings of about 179 grams and 187 grams are poured. After two days' exposure in indoor atmospheric conditions, the 179 gram casting will weigh about 139 grams. Likewise, after two days of oven exposure at 150° F. the 187 gram casting will weigh about 96 grams. In each instance, therefore, it will be observed that a substantial weight reduction (i.e., water loss) is effected by the use of a surfactant, 44% under room conditions and 98% under oven conditions.

EXAMPLE IV

Another 400 gram sample of the emulsion described in Example II is modified with 16 grams of the surfactant Arlacel® C (about 7.5% based upon resin weight) and two 150 gram castings are poured. After two days' exposure in indoor atmospheric conditions one of the castings will weigh about 147 grams indicating a 3 gram or a 4% water loss. The other casting after demolding and exposure in a 150° F. oven for about 24 hours will weigh about 142 grams indicating an 8 gram or a 10% water loss.

EXAMPLE V

Another 400 gram sample of the emulsion described in Example II is modified with 14 grams of the surfactant Arlacel® C (about 7% based upon resin weight) and two 150 gram castings are poured. After two days' exposure in indoor atmospheric conditions one of the castings will weigh about 95 grams indicating a 70% water loss. The other casting after demolding and exposure in a 150° F. oven for about 24 hours will weigh about 76 grams indicating a 74 gram or 100% water loss.

EXAMPLE VI

A water-extended polyester emulsion is prepared as follows: 50% water-extendible polyester resin (WEP)—commercially available 1.25% (based on resin weight) cobalt-octoate (12%)
0.50% (based on resin weight) dimethylaniline
50% (approximate) water This emulsion is further modified by the addition of 5% (based on resin weight) of a surfactant blend (i.e., 50% sorbitan trioleate and 50% polyoxylene sorbitan trioleate—HLB approx. 6.5) to which is added 0.50% (based on resin weight) of a methyl ethyl ketone peroxide/hydrogen peroxide blended catalyst. In this instance, about 65–75% of the water that has been added to the emulsion will be released during and subsequent to gelling of the compound.

EXAMPLE VII

An emulsion similar to that prepared in Example VI is modified with 4% of the detergent JOY® (HLB approx. 14) and 2% methyl ethyl ketone peroxide/hydrogen peroxide blend (both based upon resin weight). After demolding samples will experience between a 30 and 50% loss of water depending upon exposure conditions subsequent thereto.

EXAMPLE VIII

A catalyzed emulsion including the following constituents is prepared:

250 grams Ashland Chemical Co. WEP 21
3.1 grams cobalt-octoate (12%) (1.25% by wt. of resin)
0.5 gram dimethylaniline (0.2% by wt. of resin)
12.5 grams Atlas Chem. Ind. Arlacel® C (5% wt. of resin)
12.5 grams styrene monomer (5% by wt. of resin)
250 grams water
1.25 grams methyl ethyl ketone peroxide/hydrogen peroxide blend (0.5% based on wt. of resin).

Inclusion of the styrene monomer results in a viscosity of about 27 seconds for the emulsion and tends to improve its pour characteristics. Similar casting of about 200 grams each are poured and allowed to gel. Upon demolding one such casting is exposed to 150° F. oven temperatures for one day at the end of which time the casting will weight about 97 grams. After a similar one day exposure to indoor atmospheric conditions, a second casting will weigh about 146 grams.

EXAMPLE IX

A catalyzed emulsion having the following constituents is prepared:

200 grams 32–177 Polylite® polyester resin—promoted and including about 50% polyester; 10% emulsifier; and 40% styrene monomer (Reichhold Chemicals, Inc.)
10 grams Arlacel® C (Atlas Chem. Inc.)
200 grams water
4 grams methyl ethyl ketone peroxide.

This emulsion is then poured into several molds and allowed to gel (about 14 minutes). Upon demolding two of the water-extended polyester resin castings will weigh approximately 161 and 175 grams, respectively. After about three days' exposure to indoor atmospheric conditions, the 161 gram casting will weigh about 121 grams. Similarly, after about three days of oven exposure at 150° F. the 175 gram casting will weigh about 86 grams.

EXAMPLE X

An emulsion similar to that of Example IX is prepared except that 32–178 Polylite® polyester resin is employed. Several castings are poured and allowed to gel (about 4 minutes). After about a three-day oven exposure at approximately 150° F. a 171 gram casting will weigh about 89 grams. Further, after about a three-day indoor atmospheric exposure, a 180 gram casting will weigh about 150 grams.

EXAMPLE XI

Similar samples to those described in Example I are prepared, one batch (A) including approximately 5% Arlacel® and a second batch (B) containing none. Mix conditions for parts of each batch are varied as indicated with the results noted:

Batch A (1) Mixer speed approximately 2500 r.p.m.
  Mix time about 1 minute
  Water loss approximately 95%
(2) Mixer speed approximately 4000 r.p.m.
  Mix time about 1 minute
  Water loss approximately 60%
(3) Mixer speed about 5500 r.p.m.
  Mix time approximately 1 minute
  Water loss about 30%.

Batch B

Similar mixer speeds and times are employed with the result of little or no water loss in each case.

EXAMPLE XII

Two batches "A" and "B" of catalyzed emulsions having the following constituents are prepared:

50.0 ounces (50%) water extendible polyester resin (Aropol WEP 21)
0.63 ounce (1.25%) cobalt octoate (12%)
0.25 ounce (0.5%) dimethylaniline (DMA)
0.10 ounce (0.2%) 20% solution of hydroquinone in methylcellosolve
50.0 ounces (50%) water
2.5 ounces (5%) Perlite (PA–130)[1] Batch "A"
1.0 ounce (2%) Perlite (PA–130) Batch "B"

Each is hand mixed and catalyzed with about 0.25 ounce (0.5%) of Methyl ethyl ketone peroxide. The respective batches A and B are thereafter cast into approximately 2 pound 9 ounce, 23 inch long shelf-like articles. After curing each cast article was severed approximately at the center to provide comparable sections for oven and room temperature exposure. The following water loss was exhibited by each section:

|  | Percent at— | | |
|---|---|---|---|
|  | 24 hrs. | 48 hrs. | 72 hrs. |
| 5% Perlite (130) (125° F.) | 27.5 | 35 | 42.5 |
| Room temperature | 12.5 | 17.5 | 17.5 |
| 2% Perlite (130) (150° F.) | 18.6 | 20.9 | 27.9 |
| Room temperature | 9.3 | 9.3 | 11.7 |

EXAMPLE XIII

To determine the effect of a combination of Perlite and Arlacel C on water extended polyester material, the following standard emulsion was prepared:

50% water extendible polyester resin (Aropol WEP 21) consisting of about 50% polyester; 40% styrene monomer; and 10% emulsifier
1.25% (12%) cobalt octoate
0.2% dimethylaniline (DMA)
0.1% inhibitor (20% solution of hydroquinone in methylcellosolve)
50% water.

The various batches are catalyzed with 0.5% of methyl ethyl ketone peroxide, and those employing Arlacel® C will have had it added to the resin, and those using Perlite (i.e., PA–2 [1] passed through a 40 mesh screen) will have had it mixed into the catalyzed emulsion. All percentage values noted are based upon resin weight. Also each sample produced from the various batches is exposed to about a 150° F. oven atmosphere after they have gelled.

Batch and Sample A—contained an additional 5% of Arlacel® C.
Batch and Sample B—contained 1% Perlite.
Batch and Sample C—contained 2% Perlite.
Batch and Sample D—contained 1% Perlite and an additional 1% Arlacel® C.
Batch and Sample E—contained 1% Perlite and an additional 1% Arlacel® C.
Batch and Sample F—contained 2% Perlite and an additional 1% Arlacel® C.
Batch and Sample G—contained 2% Perlite and an additional 1% Arlacel® C.

[1] PA-2 and PA-130 are volcanic silicates available from the Coralux Perlite Corporation of New Jersey. The density of such materials is approximately between 3.5 and 10 pounds per cubic foot and the material particle size distribution is:

| Tyler standard screen mesh | Percent of— | |
|---|---|---|
|  | PA-2 | PA-130 |
| 8 | None | None |
| 16 | 12 | Trace |
| 20 | 23 | 10 |
| 30 | 30 | 9 |
| 50 | 23 | 40 |
| 100 | 4 | 32 |
| Above 100 | 5 | 15 |

| Sample | Water loss (percent) at— | | |
|---|---|---|---|
| | 24 hrs. | 48 hrs. | 72 hrs. |
| A | 104.3 | | |
| B | 15.7 | 18.3 | 20.3 |
| C | 20.9 | 23.5 | 25.5 |
| D | 14.3 | 18.4 | 18.4 |
| E | 12.3 | 14.4 | 17.5 |
| F | 22.6 | 25.7 | 27.2 |
| G | 18 | 22.6 | 22.2 |

A control sample containing neither Perlite nor Arlacel® C had an 11.1% water loss after 24 hours; a 14.1% loss after 48 hours; and a 16.2% loss after 72 hours.

EXAMPLE XIV

As a control, water-extended polyester (Aropol-WEP) for casting and molding that is obtainable from Ashland Chemical Company, is in the quantities specified to produce a water in oil emulsion:

50% water extendible polyester resin (WEP-21)
1% cobalt-octoate (12%) (based on weight of resin)
0.55% dimethylaniline (DMA) (based on weight of resin)
0.35% Lupersol DSW (Lucidol Div., Wallace & Tiernan Co.) (based on weight by resin)
0.50% methyl ethyl ketone peroxide (based on weight of resin).

The remainder of the composition is water.

The noted materials less the methyl ethyl ketone peroxide are hand mixed using an air motor until a good emulsion is obtained. A tachometer may be used to check the motor RPM during mixing. After emulsification, photomicrographs are made of a sample of the emulsion and other samples are catalyzed for examination of water loss. The photomicrographs are taken at about 1160× which is verified by photographing a standard scale. Particle size determinations are thereafter made using a graduated ocular magnifier and a percentage determination of the particles in various size ranges is made by actual count.

The control emulsion mixed t about 2500 r.p.m. shows particle sizes in a 0.3 to 0.5 micron range and an oven treated sample maintained at about 160° F. shows only about a 5% loss in weight over a 48-hour period.

A similar emulsion mixed at about 2500 r.p.m. and containing about 4.5% of Arlacel® C (based on weight of resin) has doughnut-like structure and exhibits a particle size distribution in about the 1.0 to 2.6 micron range. Weight loss is again about 5% after a 48 hour 160° F. oven exposure. It is estimated that more than 60% of the particles are less than 1.6 microns; that less than 40% of the particles are larger than 1.6 microns; and that less than 15% of the particles are larger than 2.3 microns.

Another similar emulsion mixed at about 1800 r.p.m. and containing about 5% of Arlacel® C (based on weight of resin) also has doughnut-like structure and exhibits a particle size distribution in 1.5 to 4.0 micron range. Weight less of about 50% is obtained upon an oven exposure at 150-170° F. for 24 hours. It is estimated that over 90% of the particles are larger than 1.8 microns and that about 40% of the particles are larger than 2.6 microns.

EXAMPLE XV

A water extended polyester metering and mixing unit (Model 951-919) that is commercially available from the Gray Company, Inc. employing modified mixer impellers is used to produce a water in oil emulsion having the following constituents:

50% Water extendible polyester resin (AROPOL 21)
50% Water
5.0% Arlacel® C (based on the weight of resin)
2.0% Promoter B [1] for Aropol WEP resin (based on the weight of resin)
0.4% Catalyst [1] for Aropol WEP resins (based on the weight of resin)

This machine operating at suggested conditions (between 20 and 40 p.s.i.g. on the pumps) produces an emulsion which after pouring and curing has released substantially all of the water originally included in the emulsion. Prior to pouring the molds are preheated to about 100° F. Subsequent to the molding or pouring of the emulsion, the molded articles are then oven treated at about 200° F. for about 4 hours to expedite the explusion of water therefrom. Such articles are thereafter found to have good physical properties and surface characteristics that make them very acceptable for paint.

[1] These systems are commercially available from the Ashland Chemical Company.

I claim:
1. A molding method capable of substantially wholly dehydrating the cured product formed thereby in a period of between about 12 and 24 hours at about between 150° F. and 200° F. and comprising the steps of:
   (1) blending together a water-extendible polyester resin having between about 45% and 55% of an ethylenically unsaturated polyester resin, 35% to 45% of a copolymerizable ethylenically unsaturated monomer, and 13% and 17% of an emulsifier having an HLB rating of between about 1 and 9 each percentage being based upon total weight of resin, monomer and emulsifier; water in quantities of between about 40% and 70% based upon weight of resin, monomer, emulsifier and water;
   (2) mixing the emulsion formed thereby to a degree such that a particle size distribution in the 1.5 to 4.0 micron range with approximately about 90% thereof being larger than 1.8 microns is produced;
   (3) introducing the properly mixed emulsion into a mold prior to the gelling thereof;
   (4) curing said composition; and
   (5) exposing the subsequently molded product to atmospheric conditions suitable for the removal of water from the product.
2. A molding method according to claim 1 wherein the emulsion particle size distribution as produced by mixing includes about 40% thereof in a range of between about 2.6 and 4.0 microns.
3. A water-extended polyester product produced by the method of claim 1.

References Cited
UNITED STATES PATENTS

| | | | |
|---|---|---|---|
| 3,726,819 | 4/1973 | Dijkhuizen | 260—22 CB |
| 3,734,867 | 5/1973 | Will | 260—29.2 VA |
| 3,740,353 | 6/1973 | Patrick et al. | 260—29.2 VA |

MURRAY TILLMAN, Primary Examiner

A. H. KOECKERT, Assistant Examiner

U.S. Cl. X.R.

260—2.5 N, 29.6 NR, 29.6 WQ